United States Patent [19]

Mitchell et al.

[11] 4,245,611

[45] Jan. 20, 1981

[54] CERAMIC INSULATED ENGINE PISTONS

[75] Inventors: Harry R. Mitchell, Bloomfield Hills; Hal H. Rice, Birmingham, both of Mich.

[73] Assignee: General Motors Corporation, Detroit, Mich.

[21] Appl. No.: 939,457

[22] Filed: Sep. 5, 1978

[51] Int. Cl.³ .................................................. F02B 75/08
[52] U.S. Cl. ...................................... 123/669; 92/176; 123/193 P
[58] Field of Search .......... 123/191 R, 191 A, 193 P, 123/193 R; 92/176

[56] References Cited

U.S. PATENT DOCUMENTS

| | | | |
|---|---|---|---|
| 1,490,849 | 4/1924 | Philip | 123/191 A |
| 3,038,458 | 6/1962 | Mansfield | 123/191 A |
| 3,408,995 | 11/1968 | Johnson | 123/191 A |
| 3,596,571 | 8/1971 | Hill et al. | 123/193 P |
| 3,882,841 | 5/1975 | Silverstein | 92/176 |
| 4,018,194 | 4/1977 | Mitchell et al. | 123/193 P |

FOREIGN PATENT DOCUMENTS 0147036   6/1952   Australia ............................ 123/191 A

*Primary Examiner*—Craig R. Feinberg
*Attorney, Agent, or Firm*—Robert J. Outland

[57] ABSTRACT

Internal combustion engine pistons are provided with aluminum bodies with highly insulative ceramic inserts cast in place in the upper combustion chamber defining wall. In each of the disclosed embodiments, the ceramic insert has tapered edges to dovetail the insert in place. A fibrous ceramic cushioning layer applied around the insert edge before casting distributes cooling stresses and allows limited relative expansion and contraction of the aluminum body and ceramic insert without overstressing either of the members. Other features are also included.

3 Claims, 6 Drawing Figures

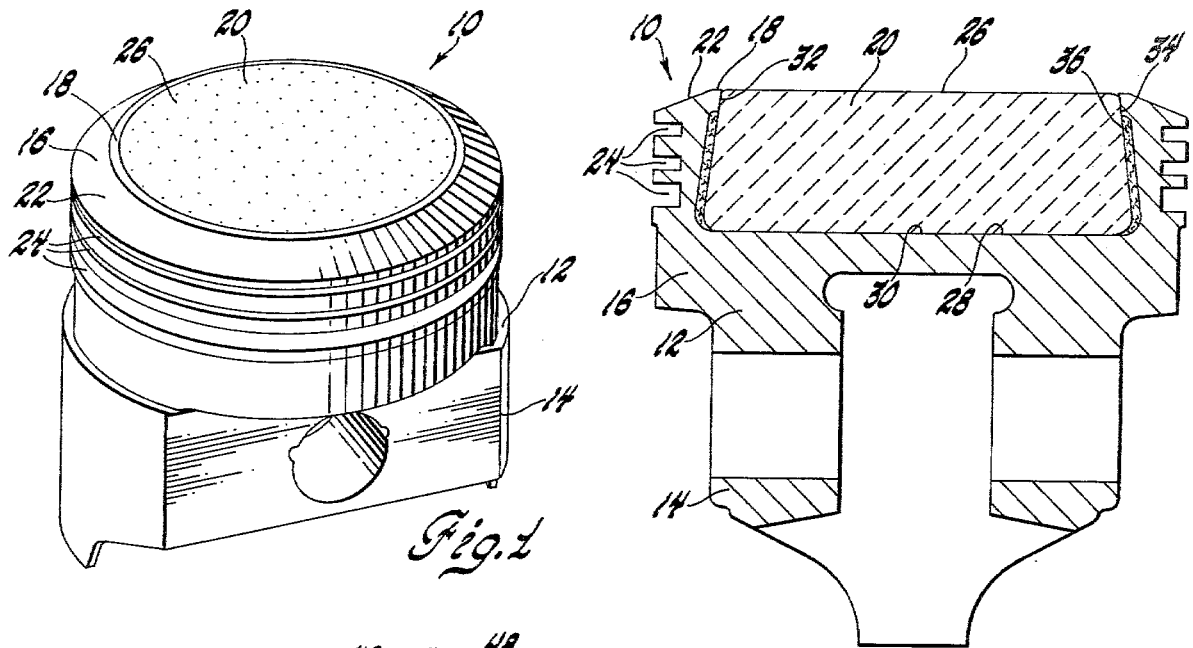
Fig.1
Fig.2
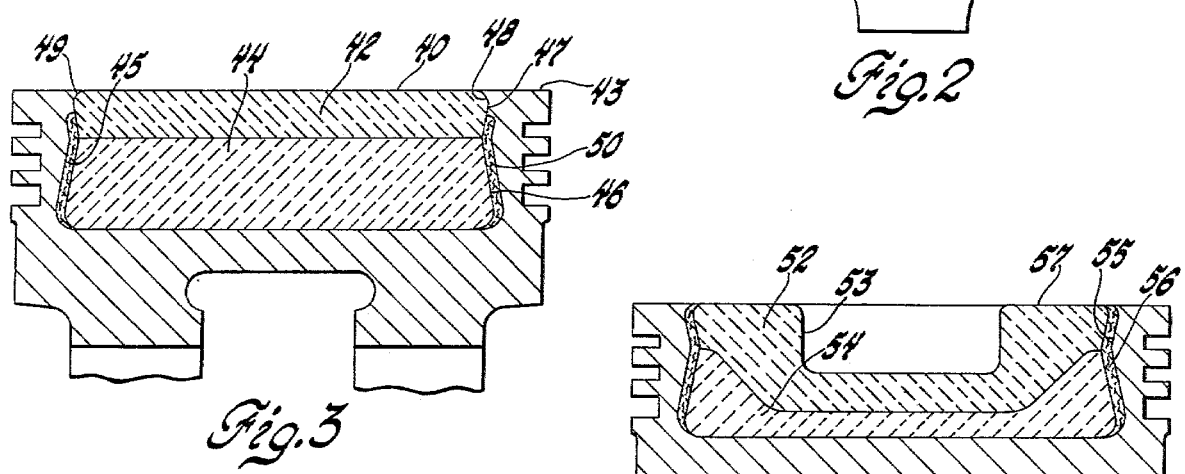
Fig.3
Fig.4
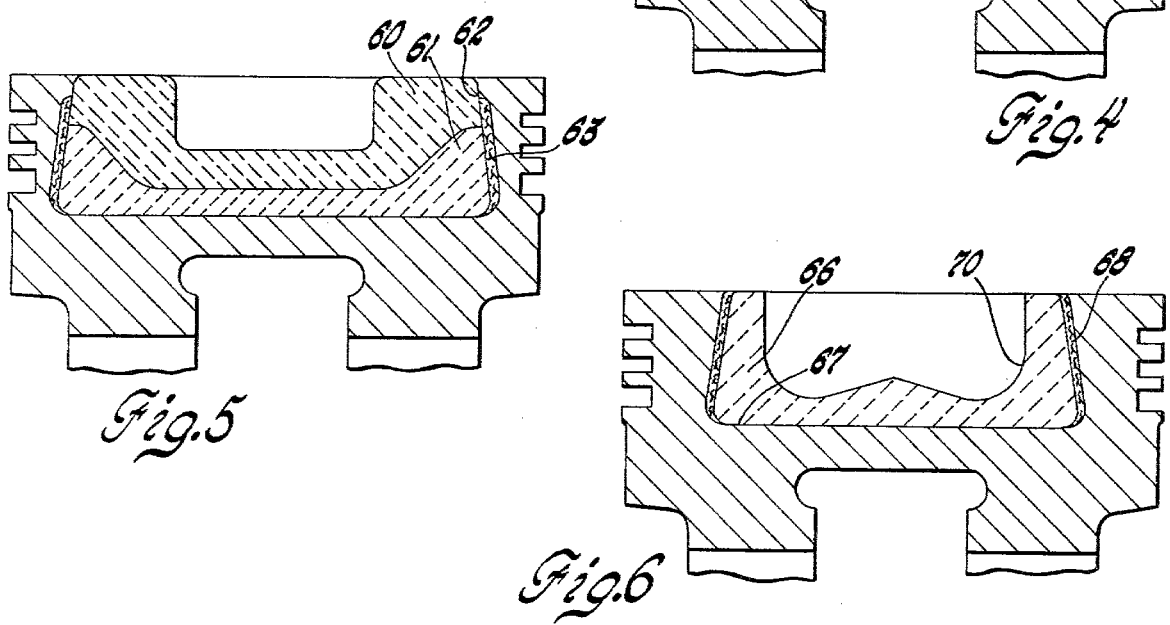
Fig.5
Fig.6

4,245,611

CERAMIC INSULATED ENGINE PISTONS

TECHNICAL FIELD

This invention relates to insulated pistons for internal combustion engines and, more particularly, to composite pistons having aluminum body constructions cast around combustion chamber wall inserts of highly insulative ceramic selected and designed to withstand casting and operating stresses.

BACKGROUND

From time to time in the past, proposals have been made to provide engine pistons and other combustion wall defining surfaces of an engine with insulating means, such as ceramic coatings or inserts, air gaps and the like. Such proposals have had various purposes, including raising combustion temperatures, reducing heat losses, improving engine efficiency, reducing wall quenching and reducing exhaust hydrocarbons and other undesirable exhaust emissions. Generally, however, proposed insulated piston designs have not been found satisfactory for reasons such as difficulty or incapability of manufacture, inadequate durability or limited insulating capability insufficient to obtain the desired control of heat flow. Thus, little use has so far been made, to applicants' knowledge, of insulated piston and combustion chamber constructions in practical production engines.

SUMMARY OF INVENTION

The present invention provides a plurality of related constructions of ceramic insulated pistons. All combine a high degree of insulating value with practical structure capable of withstanding manufacturing and operating stresses and suitable for extended operation in gasoline or diesel fueled engines.

Pistons made in accordance with the invention have the common features of an aluminum main body cast around a disc-like insert formed, at least in part, from relatively hard and brittle ceramic which forms the central portion of the top, or combustion chamber defining, wall of the piston. The insert is positively locked within the aluminum body by a reverse tapered, or re-entrant, dovetail formation of the edges of the recess in which the insert is located. The build-up of excessive stresses in the ceramic insert and its surrounding aluminum body is avoided by providing a compressible cushioning layer of fibrous ceramic material around the edges of the insert, which allows for limited relative expansion and contraction of the insert and body during the various stages of manufacture of the piston and its subsequent operation in an engine.

The ceramic insert may be formed as a single piece of constant density or may comprise a multi-piece member with a high density outer surface and an inner element of lower density for increased insulative value. The elements may, if desired, be made from more than one material. Numerous other features and advantages of the invention will be more fully understood from the following description of certain preferred embodiments taken together with the accompanying drawings.

BRIEF DESCRIPTION OF DRAWING

In the drawing:

FIG. 1 is a ceramic insulated automotive type gasoline engine piston formed in accordance with the invention;

FIG. 2 is a cross-sectional view of the piston of FIG. 1 illustrating the configuration and location of the ceramic insert;

FIG. 3 is a cross-sectional view similar to FIG. 2 but showing an alternative embodiment of ceramic insulated gasoline engine piston; and FIGS. 4, 5 and 6 are cross-sectional views similar to FIG. 3 and showing various embodiments of ceramic insulated pistons having combustion chamber recesses for use with automotive diesel type engines.

BEST MODE FOR CARRYING OUT THE INVENTION

Referring to FIGS. 1 and 2 of the drawing, there is shown a fully machined piston generally indicated by numeral 10. Piston 10 is formed in accordance with the present invention and is of a type designed for use in automotive spark ignition engines. Piston 10 is formed with an aluminum body 12 which includes a lower skirt and piston pin receiving portion 14 and an upper head and sealing ring receiving portion 16.

The head portion 16 includes a combustion chamber defining wall 18 which faces generally upwardly as shown in the drawing. A ceramic insert 20, formed and arranged in accordance with the invention, is disposed centrally of the upper wall 18. Outwardly of the insert, the periphery of the wall is chamfered at 22 as is sometimes done in spark ignition engine pistons to reduce the combustion chamber crevice volume. Below the chamfered portion on the outwardly facing annular sides of the head portion 16 there are provided a plurality of ring grooves 24 for receiving conventional compression and oil control piston rings, not shown.

The ceramic insert 20 is formed in a disc-like shape having a machined upper surface 26 that forms the central portion of the combustion chamber defining wall 18. The insert is received in an upwrdly facing recess 28 that opens through the wall 18, the recess being provided with a generally flat bottom 30 and an edge portion 32 which tapers upwardly and inwardly in opposition to the similarly tapered outer edge 34 of the ceramic insert 20, thus positively locking the insert in place within the recess 28 in a dovetail construction.

Between the edges 32, 34 of the recess and insert, there is disposed a compressible cushioning layer 36 of fibrous ceramic material which extends from the bottom of the opposing edges to a point clost to but short of the top thereof. The cushioning layer has the purpose of permitting limited relative expansion and contraction of the opposed portions of the ceramic insert and aluminum piston body to reduce and distribute compressive loads between the members so as to avoid overstressing and damaging either during both the manufacture and subsequent operation of the piston. Details as to materials which may be used and the manner of making pistons of the type described will be discussed subsequently.

FIGS. 3–6 illustrate various alternative embodiments which are intended merely to represent some of the many ways of which pistons may be made in accordance with the principles of the invention. These embodiments are generally similar to that of FIGS. 1 and 2, but differ in the makeup and configuration of the ceramic inserts and their corresponding recesses and, in some cases, the outer cushioning layer. In addition, the optional chamfer of the outer portion of the upper piston wall is not shown in these embodiments, although such a feature could be provided if desired.

In the embodiment of FIG. 3, the ceramic insert 40 is formed in two pieces: a high density outer portion 42 which forms a part of the combustion chamber defining wall 43, and a lower density foam-like lower portion 44 which is cemented to the outer portion and supports it within the recess or cavity 45 in the piston head. The outer edge 46 of the lower portion and the opposing edge of the recess 45 are tapered upwardly and inwardly to lock the insert in place; however, the upper portion 42 has its outer edge 47 tapered outwardly in an upward direction, and it is locked in place only by lip 48 of aluminum formed over the radiused upper edge 49 of the insert, as well as by the fact that it is cemented to the locked in lower portion. A peripheral cushioning layer 50 is provided as in the first described embodiment.

The embodiment of FIG. 4 differs from that of FIG. 3 in that the dense upper portion 52 of the insert is thicker and includes an outwardly opening central cavity 53 which is adapted to form a portion of a diesel engine combustion chamber. This embodiment also includes a low density lower portion 54 of the insert which is recessed to mate with the thicker upper portion and is cemented thereto as in the embodiment of FIG. 3. The shape of the piston recess 55 is generally the same as in the embodiment of FIG. 3, but the cushioning layer 56 is shown as extending over the entire edge of both portions of the insert from the bottom to the combustion chamber defining wall 57. With such a construction, it may be desired to provide a metal sealing ring, not shown, to protect the upper edge of the cushioning layer.

The embodiment of FIG. 5 is similar to that of FIG. 4 in the arrangement of the insert, except that the upper and lower portions 60, 61 of the insert are both tapered inwardly and the recess 62 and cushioning layer 63 are both formed in the shape of the corresponding portions of the embodiment of FIG. 2. Otherwise, the construction is the same as the FIG. 4 embodiment.

The embodiment of FIG. 6 again discloses an insert 66 formed of a single piece of high density material and received in an inwardly tapered recess 67 similar to that of the embodiment of FIG. 2. The arrangement differs, however, in that the cushioning layer 68 extends between the full opposed edges of the insert and cavity, as in the embodiment of FIG. 4, and a larger upwardly opening cavity 70 is provided within the insert to form a diesel engine combustion chamber. The walls of the insert are thus relatively thinner than in the embodiments of FIGS. 4 and 5.

It should be understood that the above-described embodiments are intended to be merely illustrative of the types of piston constructions which may be formed within the scope of the present invention using the materials and methods of construction which will now be discussed.

In manufacturing a piston in accordance with the principles of the present invention, a ceramic insert of the desired shape is first prepared and than cast in place within the aluminum piston body. The insert is shaped so that the casting step causes it to be locked securely within the piston body so that it retains its integrity during the life of the piston. Any suitable shape which performs the locking function may be utilized, the illustrated embodiments showing only a few of the possible configurations that may be used.

In order to provide adequate insulating characteristics, it is preferred to form the insert from a ceramic material having a relatively high insulative value with adequate compressive strength to support the mechanical loads imposed thereon in use. Unfortunately, the better insulating ceramics tend to be relatively brittle and unable to absorb large tensile or shear stresses. However, adequate compressive strength is available in selected ceramic materials to permit the manufacture and satisfactory operation of engine pistons where the design is such as to limit significant loads on the ceramic member to compressive loads, as is found in the design of the above described piston embodiments.

A preferred material for one piece ceramic inserts is dense fused silica made by slip casting in plaster molds, followed by sintering. Characteristics of the fused silica casting slip are given in Table I. Fused silica is preferred because of physical characteristics which combine high insulating value with adequate compressive strength, surface smoothness, hardness and low thermal expansion.

TABLE I

| Characteristics of Fused Silica* Casting Slip | | |
|---|---|---|
| | | Range |
| Solids, % | | 81.8–82.8 |
| pH | | 4.8 5.4 |
| Viscosity, centipoise | | 185–265 |
| Settling rate (mm) | 1 hour | 0.9–1.0 |
| | 5 hours | 1.17–1.27 |
| Particle size, % finer than | 40μ | 92–86 |
| | 20μ | 73–69 |
| | 10μ | 54–51 |
| | 5μ | 38–35 |
| | 2μ | 24–20 |
| | 1μ | 15–12 |

*99+ % SiO$_2$

Other materials which may be used for forming ceramic inserts are cordierite, beta spodumene-mullite and a special fused silica-clay material. These materials can be formed into inserts by either slip casting, dry or semi-wet pressing or ram pressing. Casting compositions of beta spodumene-mullite and cordierite are given in Table II, and compositions for ram pressing all three materials are listed in Table III.

TABLE II

| Beta Spodumene-Mullite and Cordierite Casting Compositions for Piston Inserts | | |
|---|---|---|
| | Beta Spodumene-Mullite (CBR) Parts by Weight | Cordierite (C3RN-1) Parts by Weight |
| Thermal Grain #3* | 50.0 | — |
| Velvacast Kaolin | 30.0 | — |
| Todd Light Ball Clay | 20.0 | — |
| Sierralite Talc | — | 42.6 |
| Ajax P (jigger) Kaolin | — | 16.3 |
| Jackson Ball Clay | — | 17.6 |
| Alumina (RC-152 DBM) | — | 12.5 |
| Silica, (Morgan 200 mesh) | — | 11.0 |
| Titania (AWD) | — | 1.0 |
| Water | 42.0 | 52.8 |
| Darvan C | — | 0.05 |

*Beta spodumene

TABLE III

Composition of Some Low Thermal Expansion Ceramics for Ram Formed Insulative Piston Inserts*

| | Fused Silica-Clay | Beta Spodumene Mullite (RR) | Cordierite (C3 RN-12) |
|---|---|---|---|
| Fused Silica, D and RG** | 30 | — | — |
| Fused Silica, 97% —325 mesh | 50 | — | — |
| Jackson ball clay | 15 | 20 | 18.3 |
| Ajax P jigger Kaolin | 5 | 15 | 17.0 |
| Velvacast Kaolin | — | 15 | — |
| Thermal Grain #3*** | — | 50 | — |
| Steawhite talc, 325 mesh | — | — | 43.2 |
| Alumina, RC-152 DBM | — | — | 20.5 |
| Titania, AWD | — | — | 3.0 |
| Propylene glycol alginate | 0.18 | — | — |
| Propylene glycol | 0.10 | — | — |
| Water, % | 23 | 25 | 23.5 |

*Parts by Weight.
**97% minus 325 mesh material which has been wet ground by ball milling, dried and reground (pulverized).
***Beta spodumene (calcined alpha spodumene).

When forming a two-piece insert, such as those of FIGS. 3–5 of the drawing, the top portion is formed in the manner above described for one-piece inserts. The lower portion may be machined from low density fused silica foam or cast and sintered in the desired shape. The upper and lower portions are then cemented together with a fused silica cement slurry, air dried and subsequently furnace fired. Some physical characteristics of the suggested piston insert materials are shown in Table IV.

TABLE IV

Some Physical Characteristics of Certain Ceramic Materials for Piston Inserts

| Material | Sintering Condition | Density kg/m³ | Apparent Porosity % | Flexural Strength k,Pa | Thermal Expansion Coefficient 20-800° C. μm/m/°C. | Thermal Condutivity w/m K |
|---|---|---|---|---|---|---|
| Fused Silica | 1145° C.-8 hrs. Steam | 1800 | 14.0 | 24,130 | 0.6 | 0.7 |
| Beta Spodumene-Mullite (CBR) | 1340° C.-1 hr | 2330 | 0.6 | 86,125 | 2.1 | 1.8 |
| Cordierite | 1340° C.-8 hrs | 1840 | 29.0 | 44,600 | 1.6 | 2.1 |
| Fused Silica Foam | 1145° C.-8 hrs Steam | 400 | 81.0 | — | 0.6 | 0.18 |

After the ceramic insert is prepared, the edges of the insert are wrapped with a cushioning material which is preferably an alumina silica fiber available in one-sixteenth inch thick sheets under the trade name Fiberfrax from the Carborundum Company. The manufacturing and operating conditions determine the thickness of the cushioning layer as well as the required extent of its placement along the edges of the ceramic insert.

In initial attempts to fabricate pistons in accordance with the described embodiments, it was found that the embodiments of FIGS. 2 and 3 required the application of a double thickness wrap of approximately one-eighth inch to avoid cracking of the insert due to casting stresses. Inserts according to the embodiments of FIGS. 4 and 5 were cast in pistons satisfactorily using a single one-sixteenth thick wrap but required coverage of the full edges of the insert, as shown in FIG. 4. Contrariwise, the embodiment of FIG. 6 was able to be fabricated using only a single layer wrap of the less than full extent as illustrated in FIG. 2.

An exemplary composition of the alumina silica fibrous wrapping material is given in Table V. However, it should be understood that any other suitable cushioning material might be applied in place of the indicated material.

TABLE V

Composition of Fiberfrax* Alumina Silica Fiber

| 50.9% | Alumina | $Al_2O_3$ | (Aluminum Oxide) |
| 46.8% | Silica | $SiO_2$ | (Silicon Dioxide) |
| 1.2% | Boric Oxide | $B_2O_3$ | (Boron Trioxide) |
| 0.8% | Soda | $Na_2O$ | (Sodium Oxide) |

*Trademark of the Carborundum Company

The composite pistons are made by pouring F-332 aluminum alloy at 705 to 720 degrees centigrade around the fiber wrapped ceramic insert which is secured in the proper position in a sand mold by means of a locating tab on the top of the insert and by a chaplet at the center of the bottom of the insert adjacent to the sand core. To avoid shrinkage in the aluminum alloy during cooling as a result of heat retention by the ceramic insert, graphite chill blocks are placed on the top of the mold core under the ceramic insert. Graphite chill blocks are also used both inside and outside of the wrist pin bosses in the pin portion 14 of the piston.

Prior to pouring the aluminum alloy, the mold assembly with insert is tilted about 20 degrees from the vertical and the alloy is poured in the riser at the low position created by the tilting of the mold. The tilted mold is necessary to eliminate voids along the bottom surface of the ceramic insert. Following cooling in the mold, the composite cast piston is fully machined using normal procedures.

While the invention has been described by reference to certain preferred embodiments chosen for illustrative purposes, it should be understood that numerous changed could be made within the scope of the inventive concepts described, and it is accordingly desired that the invention not be limited except by the language of the following claims.

The embodiments of the invention in which an exclusive property or privilege is claimed are defined as follows:

1. A heat insulated piston for an internal combustion engine, said piston having a combustion chamber defining wall and comprising a main body including a cast and machined aluminum head portion having a central recess opening through said combustion chamber defining wall, a ceramic insert of generally disc-like shape wholly contained within said recess but (and) having an exposed surface forming the central portion of said chamber defining wall, said insert being relatively hard and brittle but of high compressive strength and having substantially lower coefficients of thermal conductivity and expansion than those of the aluminum head portion, said recess and said insert having opposing outer edge portions constituting substantially their entire peripheral surfaces diverging in a direction away from said combustion chamber defining wall (at least partially tapered upwardly and inwardly) to positively dovetail the ceramic insert within the aluminum head portion, and a compressible cushioning layer of fibrous ceramic material disposed between substantially all of said peripheral surfaces constituting said opposed (tapered) diverging edge portions of the insert and recess and of limited thickness sufficient to permit in operation relative expansion and contraction of the aluminum and ceramic members of the piston while distributing compressive loads between the opposed edge portions without overstressing either (of said members) the main body or the insert.

2. A piston according to claim 1 wherein said insert comprises a single piece of relatively dense ceramic material.

3. A piston according to claim 1 wherein said insert comprises a multiple layer of ceramic materials including an outer layer of relatively dense material and an inner layer of material having a substantially lower density.

* * * * *

UNITED STATES PATENT AND TRADEMARK OFFICE
CERTIFICATE OF CORRECTION

PATENT NO. : 4,245,611
DATED : January 20, 1981
INVENTOR(S) : Harry R. Mitchell and Hal H. Rice It is certified that error appears in the above-identified patent and that said Letters Patent are hereby corrected as shown below:

Title page, [73] "Detroil" should read -- Detroit --.

Col. 2, line 40, "upwrdly" should read -- upwardly --.

Col. 2, line 50, "clost" should read -- close --.

Col. 3, line 61, "than" should read -- then --.

Col. 5, line 8, Table III heading "C3" barely legible.

Col. 6, line 48, "changed" should read -- changes --.

Claim 1, Col. 6, line 62, "(and)" should be deleted.

Claim 1, Col. 7, lines 4, 5, "(at least partially tapered upwardly and inwardly)" should be deleted.

Claim 1, Col. 7, lines 10, 11, "(tapered)" should be deleted.

Claim 1, Col. 8, line 4, "(of said members)" should be deleted.

Signed and Sealed this

Twenty-sixth Day of October 1982

[SEAL]

Attest:

GERALD J. MOSSINGHOFF

Attesting Officer

Commissioner of Patents and Trademarks